US012010063B2

(12) United States Patent
Abotabl et al.

(10) Patent No.: US 12,010,063 B2
(45) Date of Patent: Jun. 11, 2024

(54) SYNCHRONIZATION SIGNAL BLOCK LESS CARRIER MEASUREMENTS

(71) Applicant: QUALCOMM Incorporated, San Diego, CA (US)

(72) Inventors: Ahmed Attia Abotabl, San Diego, CA (US); Hung Dinh Ly, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 17/664,285

(22) Filed: May 20, 2022

(65) Prior Publication Data

US 2023/0379116 A1 Nov. 23, 2023

(51) Int. Cl.
*H04L 5/00* (2006.01)
(52) U.S. Cl.
CPC ............ *H04L 5/0051* (2013.01); *H04L 5/006* (2013.01)
(58) Field of Classification Search
CPC .............................. H04L 5/0051; H04L 5/006
See application file for complete search history.

(56) References Cited

U.S. PATENT DOCUMENTS

2021/0076343 A1* 3/2021 Harada ............... H04W 56/001

FOREIGN PATENT DOCUMENTS

WO WO-2020031324 A1 2/2020

OTHER PUBLICATIONS

International Search Report and Written Opinion—PCT/US2023/017121—ISA/EPO—dated Jun. 23, 2023.
NTT Docomo et al., "Maintenance for NR Mobility Procedure", 3GPP TSG RAN WG1 Meeting #94bis, R1-1811357, 3rd Generation Partnership Project, Mobile Competence Centre, 650, Route Des Lucioles, F-06921 Sophia-Antipolis Cedex, Fra, vol. RAN WG1, No. Chengdu, China, Oct. 8, 2018-Oct. 12, 2018 Sep. 29, 2018, XP051518760, 11 Pages, paragraphs [02.1], [02.2].

* cited by examiner

*Primary Examiner* — Derrick V Rose
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may establish inter-band carrier aggregation with a synchronization signal block (SSB) anchor carrier and an SSB-less carrier. The UE may measure a synchronization signal (SS) reference signal received quality (RSRQ) of the SSB-less carrier based on a ratio of a quantity of resource blocks multiplied by an SS reference signal received power (RSRP) and divided by a New Radio (NR) received signal strength indicator (RSSI), where the SS-RSRP is measured based on an SSB on the anchor carrier. Numerous other aspects are described.

18 Claims, 12 Drawing Sheets

SYNCHRONIZATION SIGNAL BLOCK LESS CARRIER MEASUREMENTS

FIELD OF THE DISCLOSURE

Aspects of the present disclosure generally relate to wireless communication and to techniques and apparatuses for measurements of carriers that do not carry synchronization signal blocks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include establishing inter-band carrier aggregation (CA) with a synchronization signal block (SSB) anchor carrier and an SSB-less carrier. The method may include measuring a synchronization signal (SS) reference signal received quality (RSRQ) of the SSB-less carrier based on a ratio of a quantity of resource blocks multiplied by an SS-RSRP and divided by a New Radio (NR) received signal strength indicator (RSSI), where the SS-RSRP is measured based on an SSB on the anchor carrier.

Some aspects described herein relate to a method of wireless communication performed by a UE. The method may include establishing inter-band CA with an SSB anchor carrier and an SSB-less carrier. The method may include measuring an SS signal-to-interference-plus-noise (SINR) of the SSB-less carrier based on a linear average of a power contribution of resource elements carrying secondary SSs (SSSS) on the anchor carrier divided by a linear average of a noise-plus-interference power contribution over the resource elements.

Some aspects described herein relate to a method of wireless communication performed by a network entity. The method may include selecting time resources for measuring an NR RSSI in different carriers, where the different carriers include an SSB anchor carrier and an SSB-less carrier. The method may include transmitting an indication of the time resources.

Some aspects described herein relate to a UE for wireless communication. The UE may include a memory and one or more processors coupled to the memory. The one or more processors may be configured to establish inter-band CA with an SSB anchor carrier and an SSB-less carrier. The one or more processors may be configured to measure an RSRQ of the SSB-less carrier based on a ratio of a quantity of resource blocks multiplied by an SS-RSRP and divided by an NR RSSI, where the SS-RSRP is measured based on an SSB on the anchor carrier.

Some aspects described herein relate to a UE for wireless communication. The UE may include a memory and one or more processors coupled to the memory. The one or more processors may be configured to establish inter-band CA with an SSB anchor carrier and an SSB-less carrier. The one or more processors may be configured to measure an SS-SINR of the SSB-less carrier based on a linear average of a power contribution of resource elements carrying SSSs on the anchor carrier divided by a linear average of a noise-plus-interference power contribution over the resource elements.

Some aspects described herein relate to a network entity for wireless communication. The network entity may include a memory and one or more processors coupled to the memory. The one or more processors may be configured to select time resources for measuring an NR RSSI in different carriers, where the different carriers include an SSB anchor carrier and an SSB-less carrier. The one or more processors may be configured to transmit an indication of the time resources.

Some aspects described herein relate to a non-transitory computer-readable medium that stores a set of instructions for wireless communication by a UE. The set of instructions, when executed by one or more processors of the UE, may cause the UE to establish inter-band CA with an SSB anchor carrier and an SSB-less carrier. The set of instructions, when executed by one or more processors of the UE, may cause the UE to measure an RSRQ of the SSB-less carrier based on a ratio of a quantity of resource blocks multiplied by an SS-RSRP and divided by an NR RSSI, where the SS-RSRP is measured based on an SSB on the anchor carrier.

Some aspects described herein relate to a non-transitory computer-readable medium that stores a set of instructions for wireless communication by a UE. The set of instructions, when executed by one or more processors of the UE, may cause the UE to establish inter-band CA with an SSB anchor carrier and an SSB-less carrier. The set of instructions, when executed by one or more processors of the UE, may cause the UE to measure an SS-SINR of the SSB-less carrier based on a linear average of a power contribution of resource elements carrying SSSs on the anchor carrier divided by a linear average of a noise-plus-interference power contribution over the resource elements.

Some aspects described herein relate to a non-transitory computer-readable medium that stores a set of instructions for wireless communication by a network entity. The set of instructions, when executed by one or more processors of the network entity, may cause the network entity to select time resources for measuring an NR RSSI in different carriers, where the different carriers include an SSB anchor carrier and an SSB-less carrier. The set of instructions, when executed by one or more processors of the network entity, may cause the network entity to transmit an indication of the time resources.

Some aspects described herein relate to an apparatus for wireless communication. The apparatus may include means for establishing inter-band CA with an SSB anchor carrier and an SSB-less carrier. The apparatus may include means for measuring an RSRQ of the SSB-less carrier based on a ratio of a quantity of resource blocks multiplied by an SS-RSRP and divided by an NR RSSI, where the SS-RSRP is measured based on an SSB on the anchor carrier.

Some aspects described herein relate to an apparatus for wireless communication. The apparatus may include means for establishing inter-band CA with an SSB anchor carrier and an SSB-less carrier. The apparatus may include means for measuring an SS-SINR of the SSB-less carrier based on a linear average of a power contribution of resource elements carrying SSSs on the anchor carrier divided by a linear average of a noise-plus-interference power contribution over the resource elements.

Some aspects described herein relate to an apparatus for wireless communication. The apparatus may include means for selecting time resources for measuring an NR RSSI in different carriers, where the different carriers include an SSB anchor carrier and an SSB-less carrier. The apparatus may include means for transmitting an indication of the time resources.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
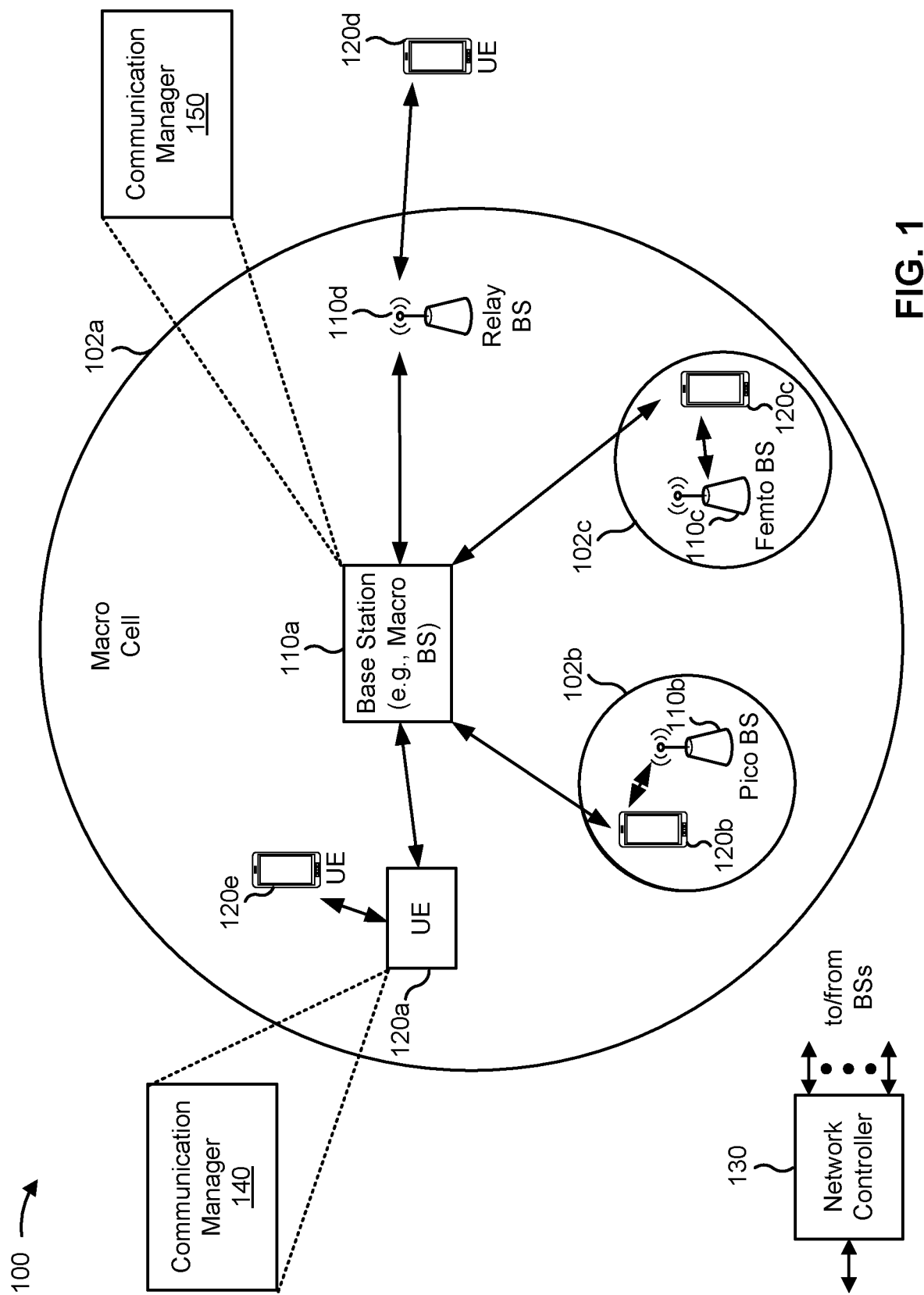
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120a, a UE 120b, a UE 120c, a UE 120d, and a UE 120e). The wireless network 100 may also include one or more network entities, such as base stations 110 (shown as a BS 110a, a BS 110b, a BS 110c, and a BS 110d), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may establish inter-band carrier aggregation (CA) with a synchronization signal block (SSB) anchor carrier and an SSB-less carrier/The communication manager 140 may measure a synchronization signal (SS) reference signal received quality (RSRQ) of the SSB-less carrier based on a ratio of a quantity of resource blocks multiplied by an SS reference signal received power (RSRP) and divided by an NR received signal strength indicator (RSSI), where the SS-RSRP is measured based on an SSB on the anchor carrier.

In some aspects, the communication manager 140 may establish inter-band CA with an SS anchor carrier and an SSB-less carrier and measure an SS signal-to-interference-plus-noise (SINR) of the SSB-less carrier based on a linear average of a power contribution of resource elements carrying SSSs on the anchor carrier divided by a linear average of a noise-plus-interference power contribution over the resource elements. Additionally, or alternatively, the communication manager 140 may perform one or more other operations described herein.

In some aspects, a network entity (e.g., base station 110) may include a communication manager 150. As described in more detail elsewhere herein, the communication manager 150 may select time resources for measuring an NR RSSI in different carriers, where the different carriers include an SSB anchor carrier and an SSB-less carrier. The communication manager 150 may transmit an indication of the time resources. Additionally, or alternatively, the communication manager 150 may perform one or more other operations described herein.

As indicated above, FIG. 1 is provided as an example. Other examples may differ from what is described with regard to FIG. 1.

Figure 2:
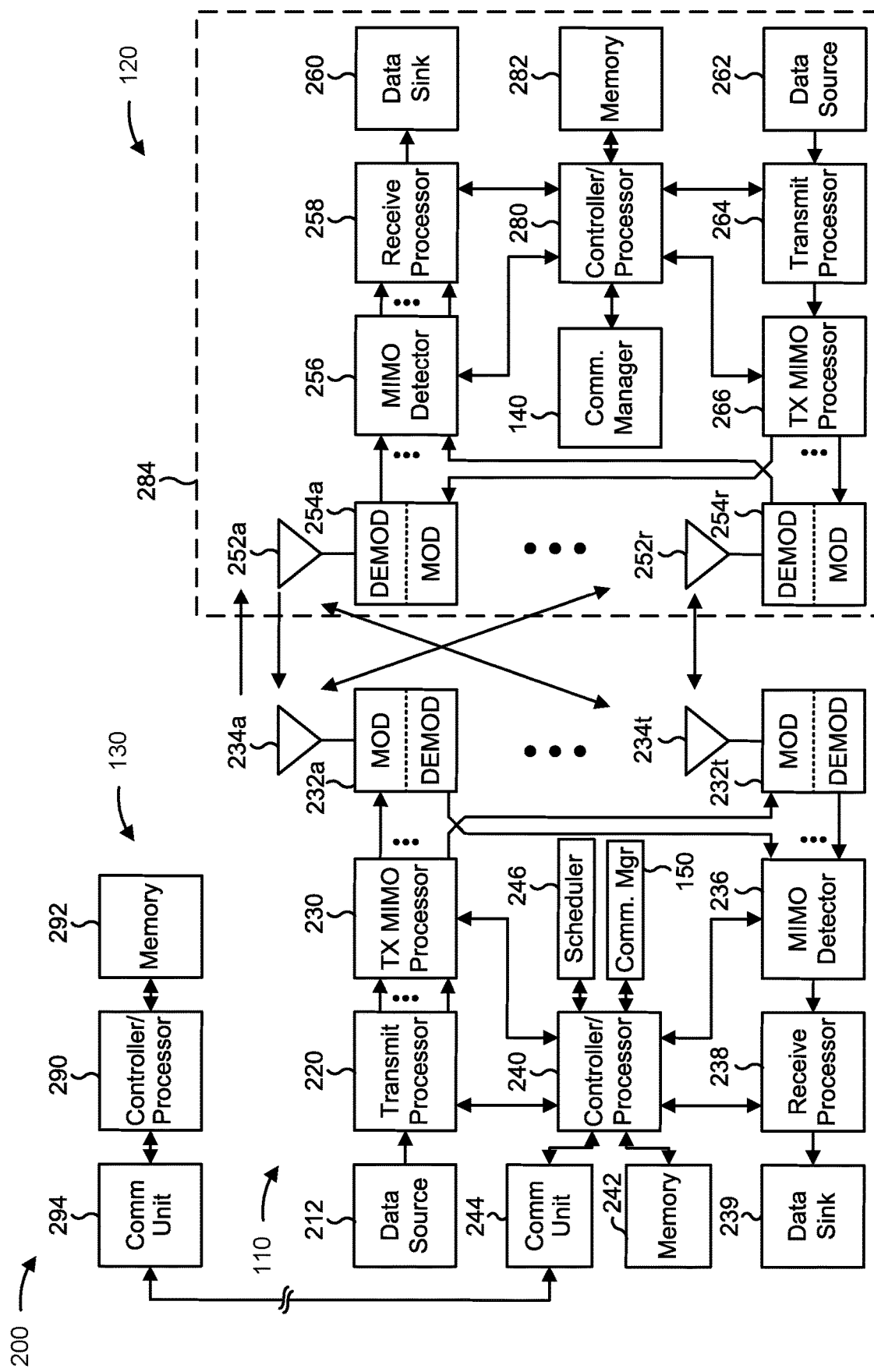
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or an SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine an RSRP parameter, an RSSI parameter, an RSRQ parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

A controller/processor of a network entity (e.g., the controller/processor 240 of the base station 110), the controller/processor 280 of the UE 120, and/or any other component(s) of FIG. 2 may perform one or more techniques associated with SSB-less measurements, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for establishing inter-band CA with an SSB anchor carrier and an SSB-less carrier; and/or means for measuring an SS RSRQ of the SSB-less carrier based on a ratio of a quantity of resource blocks multiplied by an SS-RSRP and divided by an NR RSSI, where the SS-RSRP is measured based on an SSB on the anchor carrier. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for establishing inter-band CA with an SSB anchor carrier and an SSB-less carrier; and/or means for measuring an SS SINR of the SSB-less carrier based on a linear average of a power contribution of resource elements carrying SSSs on the anchor carrier divided by a linear average of a noise-plus-interference power contribution over the resource elements.

In some aspects, a network entity (e.g., base station 110) includes means for selecting time resources for measuring an NR RSSI in different carriers, where the different carriers include an SSB anchor carrier and an SSB-less carrier; and/or means for transmitting an indication of the time resources. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
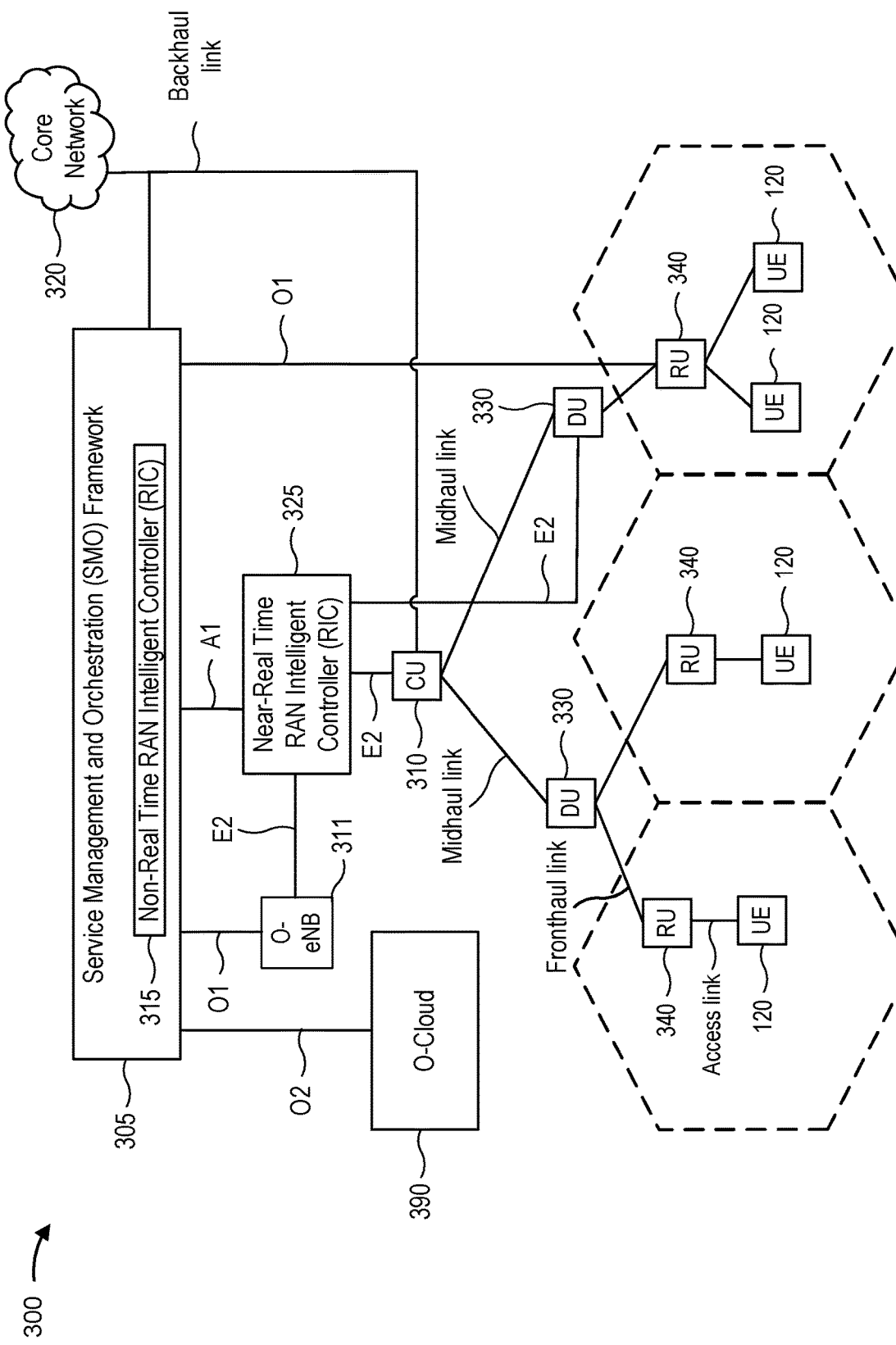
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)).

Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units.

Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
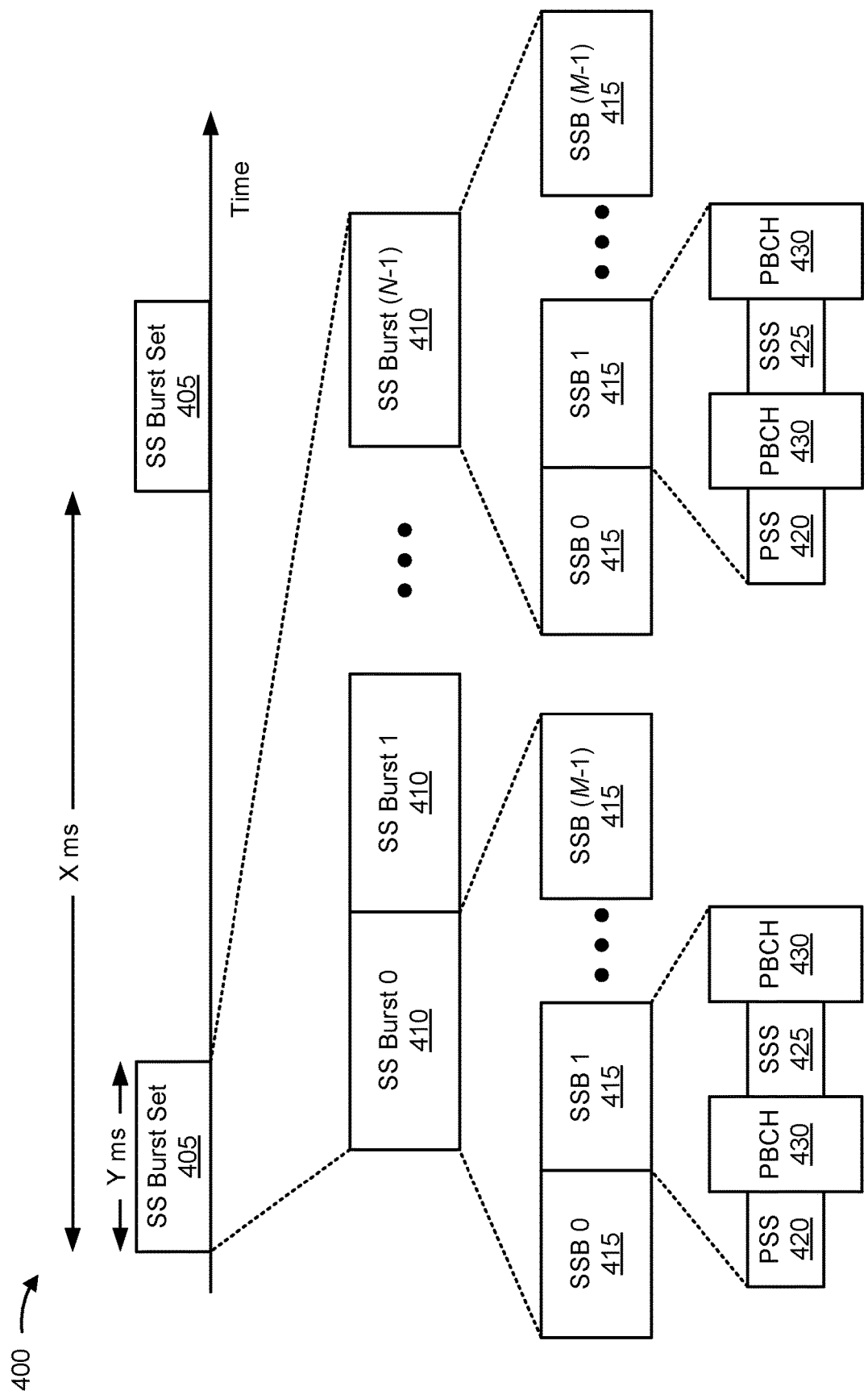
FIG. 4 is a diagram illustrating an example of synchronization signal SS hierarchy, in accordance with the present disclosure.

FIG. 4 is a diagram illustrating an example 400 of an SS hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SSBs 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a PSS 420, an SSS 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., an RSRP parameter) to a base station 110. The base station 110 and the UE 120 may use the one or more indicated SSBs 415 to select one or more beams to be used for communication between the base station 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4.

Figure 5:
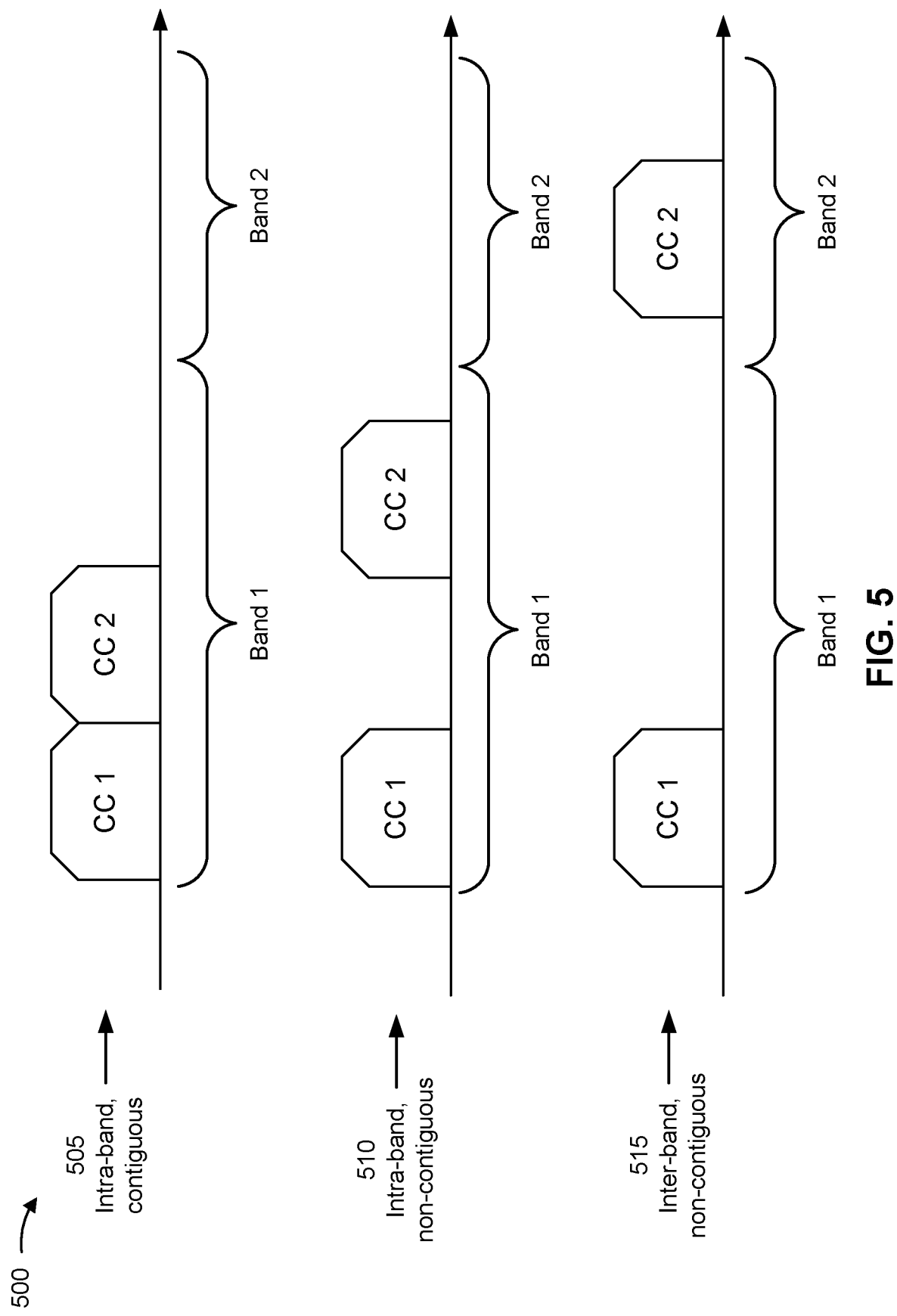
FIG. 5 is a diagram illustrating examples of carrier aggregation (CA), in accordance with the present disclosure.

FIG. 5 is a diagram illustrating examples 500 of CA, in accordance with the present disclosure.

Carrier aggregation (CA) is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A base station 110 may configure CA for a UE 120, such as in an RRC message, downlink control information (DCI), and/or another signaling message.

As shown by reference number 505, in some aspects, CA may be configured in an intra-band contiguous mode where the aggregated carriers are contiguous to one another and are in the same band. As shown by reference number 510, in some aspects, CA may be configured in an intra-band non-contiguous mode where the aggregated carriers are non-contiguous to one another and are in the same band. As shown by reference number 515, in some aspects, CA may be configured in an inter-band non-contiguous mode where the aggregated carriers are non-contiguous to one another and are in different bands.

In CA, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 5 is provided as an example. Other examples may differ from what is described with regard to FIG. 5.

Figure 6:
FIG. 6 is a diagram illustrating an example of CA carriers, in accordance with the present disclosure.

FIG. 6 is a diagram illustrating an example 600 of CA carriers, in accordance with the present disclosure.

A cellular network may consume a large amount of energy. This energy can be costly. In fact, up to a quarter of network costs may be energy costs. Most network energy consumption can come from the RAN. This can be about half of the energy consumption in an NR network. When NR massive MIMO is involved, the percentage of RAN energy consumption may be even higher. Therefore, network energy savings may be important for future expansion of cellular networks.

A network operating using CA may consume energy using multiple carriers. Example 600 shows multiple carriers used for inter-band CA. An anchor carrier may carry SSBs or system information (SI). The anchor carrier may provide time and frequency synchronization and SI for other carriers. Non-anchor carriers may be "SSB-less", or without SSBs. The network may consume more energy transmitting SSBs on the carriers and thus SSB-less carriers may be more energy efficient. SSB-less carriers may also improve SCell activation latency, by facilitating efficient SCell activation and deactivation according to the actual traffic. This conserves power. SSB-less carriers may improve resource utilization by reducing downlink overhead and allowing the network deeper sleep (e.g., longer sleep time, different level of sleep) to conserve more power. RACH procedures with SSB-less carriers may offload PRACH transmission from the PCell to an SSB-less carrier. This may reduce PRACH transmissions to reduce PRACH collisions, which improves communications for both the UE and the network. SSB-less carriers may also extend RACH coverage.

Inter-band CA operation with SSB-less carriers is expected to be limited to the neighboring carriers where radio conditions are similar (e.g., 700 MHz, 800 MHz, 900 MHz band combinations). RSRP measurements of the carriers may be used to improve beamforming and scheduling for the carriers. However, while RSRP measurements in the anchor carrier can reflect measurements in SSB-less carriers, the interference may be different in different carriers. The interference may impact SSB-based measurements, such as SS-RSRQ and SS-SINR. Inaccurate measurements can lead to degraded communications, which wastes processing resources and signaling resources.

As indicated above, FIG. 6 is provided as an example. Other examples may differ from what is described with regard to FIG. 6.

Figure 7:
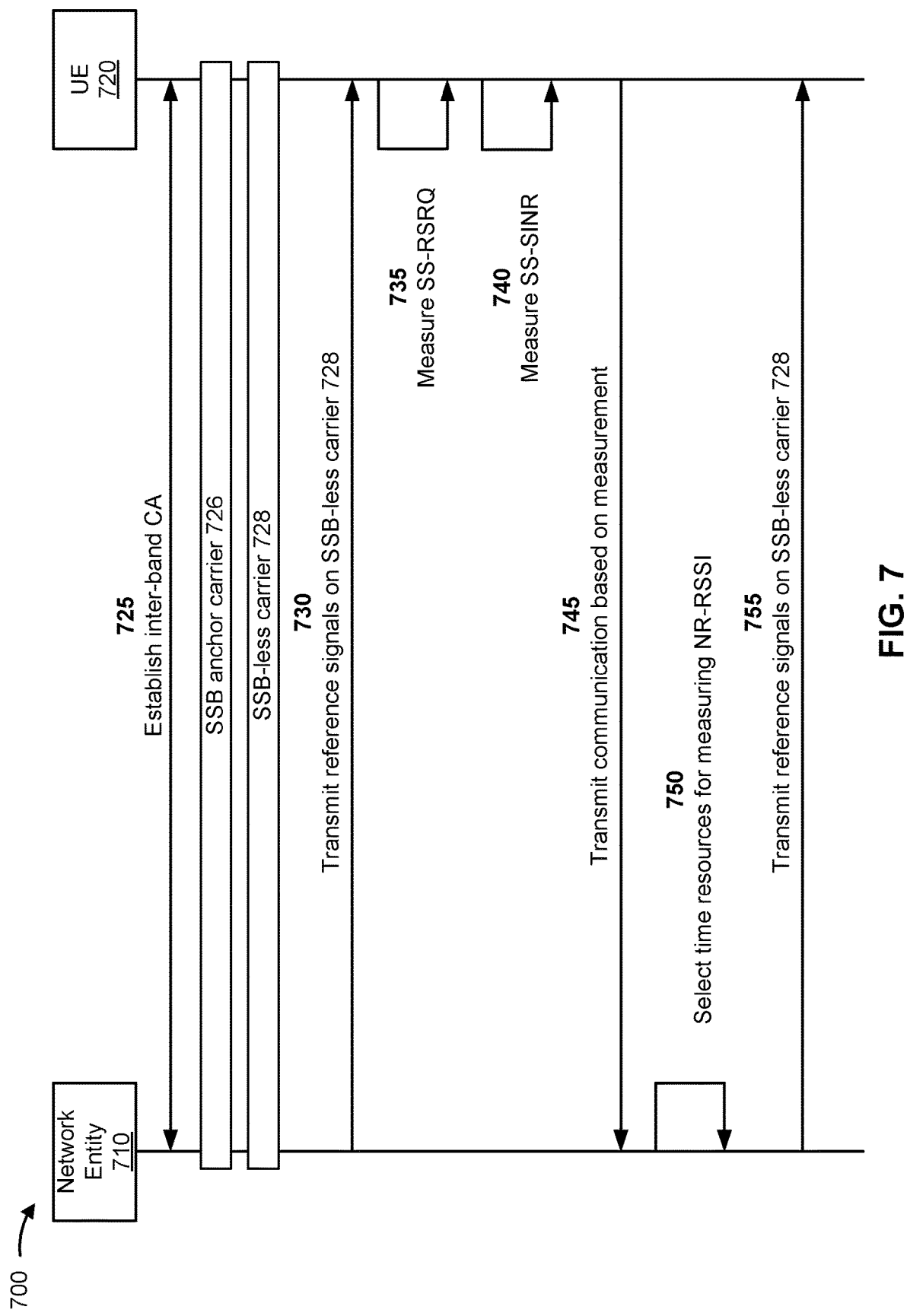
FIG. 7 is a diagram illustrating an example associated with measurements for synchronization signal block (SSB) less carriers, in accordance with the present disclosure.

FIG. 7 is a diagram illustrating an example 700 associated with measurements for SSB-less carriers, in accordance with the present disclosure. As shown in FIG. 7, a network entity 710 (e.g., a base station 110) and a UE 720 (e.g., a UE 120) may communicate with one another in a wireless network, such as wireless network 100.

In some aspects, the UE 720 may maintain RSSI and interference measurements for each carrier, including for SSB-less carriers. For example, interference measurements SS-RSRQ and SS-SINR may be enabled on the SSB-less carriers. SS-RSRQ may be measured based on SS-RSRP and an NR carrier RSSI for a carrier. SS-RSRQ may be defined as a ratio of (N×SS-RSRP)/NR carrier RSSI, where N is the number of resource blocks in the NR carrier RSSI measurement bandwidth. The measurements in the numerator and denominator may be made over the same set of resource blocks. Both SS-RSRP and NR carrier RSSI measurements may be limited to resources within an SMTC window that is configured for the carrier. SSBs for RSRP and RSSI measurements may be on the same frequency.

According to various aspects described herein, when the UE 720 computes the SS-RSRQ for an SSB-less carrier, the SS-RSRP may be based at least in part on the SSB in the anchor carrier. The SMTC for the NR carrier RSSI measurement may be based at least in part on the SMTC configured for the measurement in the anchor carrier. There may be no need to have SMTC configurations for the SSB-less carriers. The time resources for the RSSI measurement may be the same or different for different carriers. If the RSSI measurements are the same across the carriers, the UE 720 may follow the resource indication configured for the anchor carrier.

Example 700 shows an example of calculating a more accurate SS-RSRQ and a more accurate SS-SINR. As shown by reference number 725, the network entity 710 and the UE 720 may establish inter-band CA with an SSB anchor carrier 726 that carries SSBs and an SSB-less carrier 728 that does not carry SSBs. As shown by reference number 730, the network entity 710 may transmit one or more reference signals to be measured by the UE 720. The reference signals may be at least on the SSB-less carrier 728.

In some aspects, as shown by reference number 735, the UE 720 may measure an SS-RSRQ of the SSB-less carrier 728. The UE 720 may measure the SS-RSRQ based on a ratio of (N×SS-RSRP)/NR-RSSI, where the SS-RSRP is measured based on an SSB on the SSB anchor carrier 726. In some aspects, an SMTC for measuring the RSSI for the SSB-less carrier 728 may be based on an SMTC configured for measurement of the SSB anchor carrier 726. By measuring the SS-RSRQ for the SSB-less carrier 728 based at least in part on the SS-RSRP of an SSB on the SSB anchor carrier 726, the UE 720 may increase the accuracy of the SS-RSRQ, which improves communications and conserves processing resources and signaling resources.

For a carrier, SS-SINR is measured based on SSS power and interference plus noise. The SS-SINR may be the linear average over the power contribution (e.g., in Watts) of the resource elements carrying SSSs divided by the linear average of the noise and interference power contribution (e.g., in Watts) over the resource elements carrying SSSs within the same frequency bandwidth. The measurement time resource(s) for SS-SINR may be within an SMTC window duration. SS-SINR measurements may be based on SSBs on the same frequency.

In some aspects, when computing the SS-SINR in the SSB-less carrier 728, the UE 720 may measure the power contribution of the resource elements carrying SSSs based on the SSB in the SSB anchor carrier 726. The SMTC for the noise and interference measurement may be based at least in part on the SMTC configured for the measurement in the SSB anchor carrier 726. There may be no need to have SMTC configurations for the SSB-less carrier 728.

Accordingly, in some aspects, as shown by reference number 740, the UE 720 may measure an SS-SINR of the SSB-less carrier 728 based on a linear average of a power contribution of resource elements carrying SSSs on the SSB anchor carrier 726 divided by a linear average of a noise-plus-interference power contribution over the resource elements. In some aspects, an SMTC for measuring the RSSI for the SSB-less carrier 728 may be based on an SMTC configured for measurement of the SSB anchor carrier 726. In some aspects, the UE 720 may measure the SSSs on the SSB anchor carrier 726 by measuring SSBs on the same frequency on the SSB anchor carrier 726. By measuring the SS-SINR for the SSB-less carrier 728 based at least in part on the power contribution of resource elements carrying SSSs on the SSB anchor carrier 726, the UE 720 may increase the accuracy of the SS-SINR, which improves communications and conserves processing resources and signaling resources.

As shown by reference number 745, the UE 720 may transmit a communication based at least in part on one or more measurements. The one or more measurements may include the measurement of the SS-RSRQ and/or the measurement of the SS-RSSI.

In some aspects, as shown by reference number 750, the network entity 710 may select time resources for measuring an NR-RSSI in different carriers, where the different carriers include the SSB anchor carrier 726 and the SSB-less carrier 728. As shown by reference number 755, the network entity 710 may transmit an indication of the SMTC for measuring the NR-RSSI of the SSB-less carrier 728. Steps 750 and 755 may take place earlier, such as before step 735. In some aspects, the network entity 710 may transmit an indication of the SMTC for measuring the SS-RSSI of the SSB-less carrier 728. The UE 720 may measure the SS-RSSI of the SSB-less carrier 728 using a time resource indicated for the SSB anchor carrier 726.

By providing the time resources for measuring the NR-RSSI and/or the SMTC, the network entity 710 may increase the accuracy of measurements by the UE 720, which improves communications and conserves processing resources and signaling resources.

As indicated above, FIG. 7 is provided as an example. Other examples may differ from what is described with respect to FIG. 7.

Figure 8:
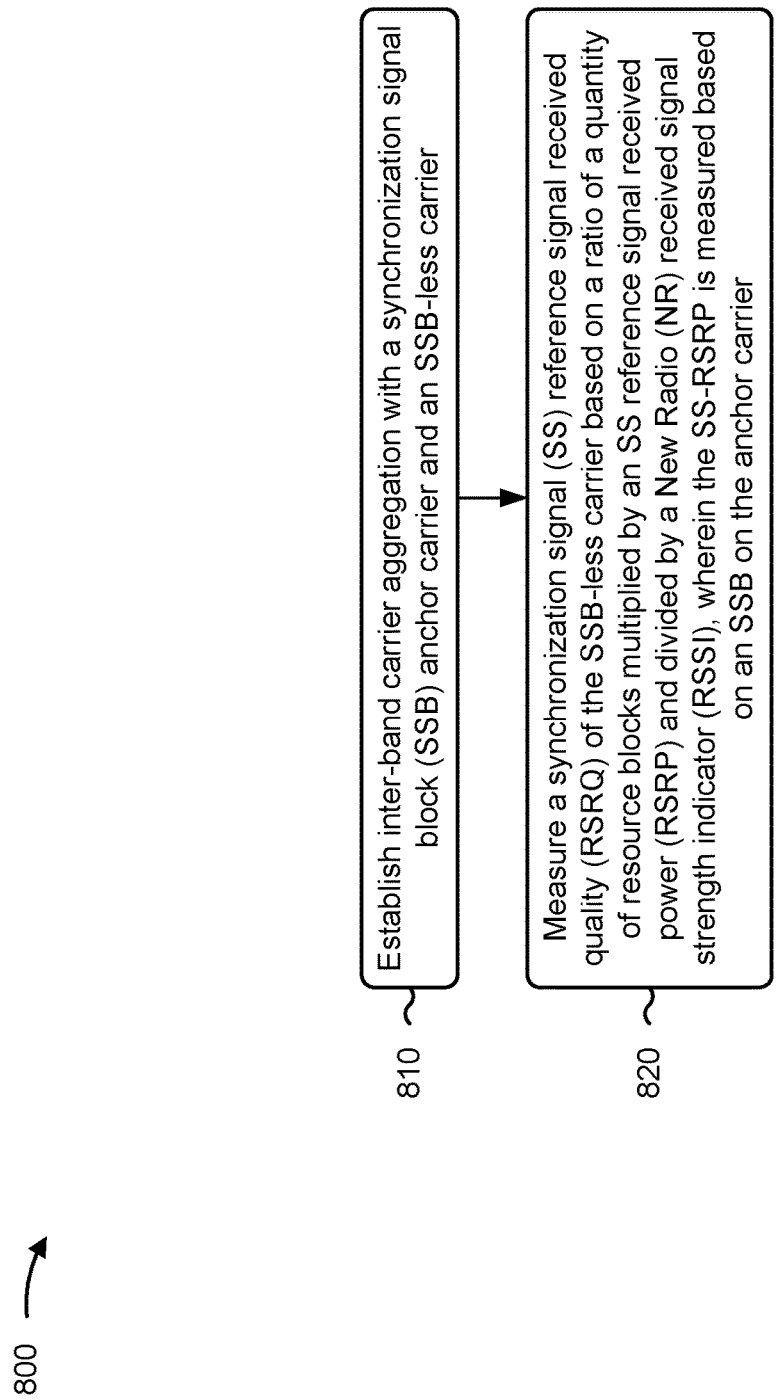
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., a UE 120, UE 720) performs operations associated with SSB-less measurements.

As shown in FIG. 8, in some aspects, process 800 may include establishing inter-band CA with an SSB anchor carrier and an SSB-less carrier (block 810). For example, the UE (e.g., using communication manager 1108 and/or CA component 1110 depicted in FIG. 11) may establish inter-band CA with an SSB anchor carrier and an SSB-less carrier, as described above.

As further shown in FIG. 8, in some aspects, process 800 may include measuring an RSRQ of the SSB-less carrier based on a ratio of a quantity of resource blocks multiplied by an SS-RSRP and divided by an NR RSSI, where the SS-RSRP is measured based on an SSB on the anchor carrier (block 820). For example, the UE (e.g., using communication manager 1108 and/or measurement component 1112 depicted in FIG. 11) may measure an RSRQ of the SSB-less carrier based on a ratio of a quantity of resource blocks multiplied by an SS-RSRP and divided by an NR RSSI, where the SS-RSRP is measured based on an SSB on the anchor carrier, as described above.

Process 800 may include additional aspects, such as any single aspect or any combination of aspects described below and/or in connection with one or more other processes described elsewhere herein.

In a first aspect, an SMTC for measuring the RSSI for the SSB-less carrier is based on an SMTC configured for measurement of the anchor carrier.

In a second aspect, alone or in combination with the first aspect, process 800 includes measuring the SS-RSSI of the SSB-less carrier using a time resource indicated for the anchor carrier.

In a third aspect, alone or in combination with one or more of the first and second aspects, process 800 includes transmitting a communication based at least in part on a measurement of the SS-RSRQ.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
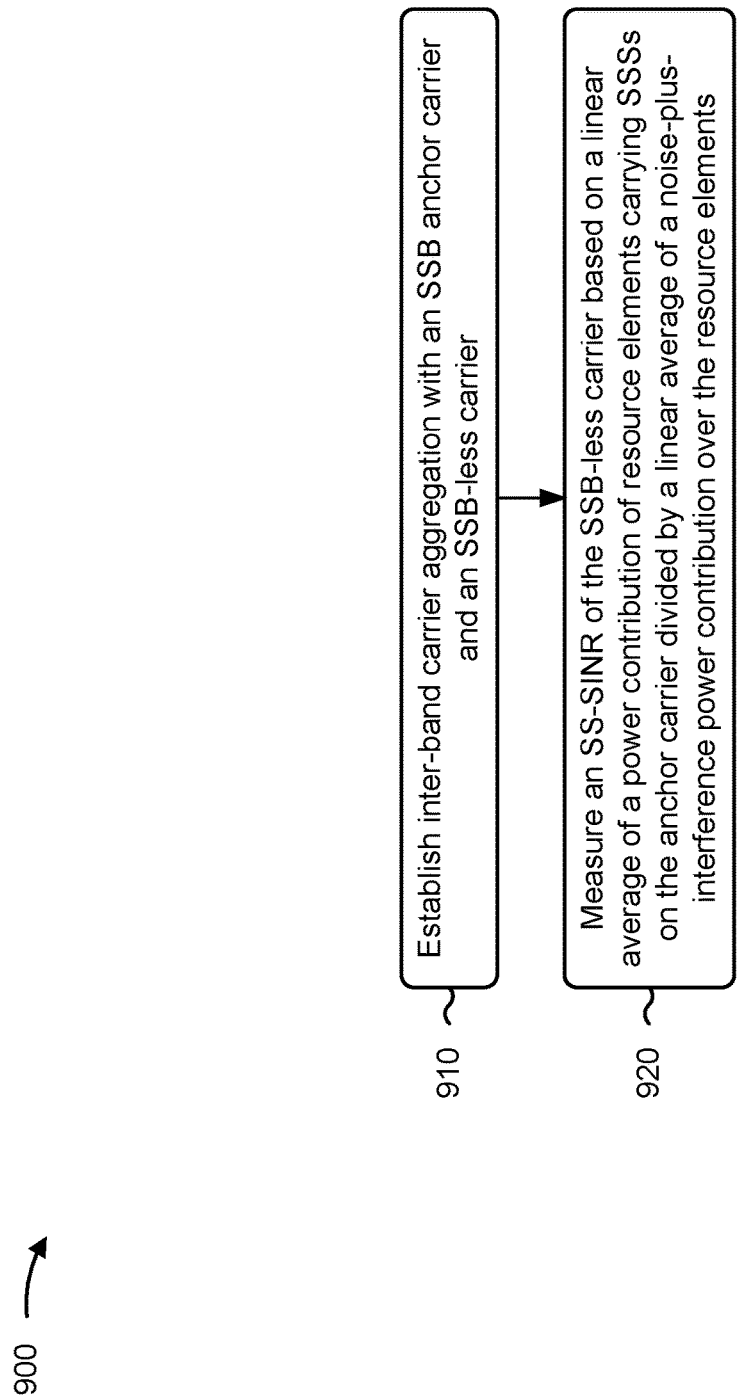
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., a UE 120, UE 720) performs operations associated with SSB-less measurements.

As shown in FIG. 9, in some aspects, process 900 may include establishing inter-band CA with an SSB anchor carrier and an SSB-less carrier (block 910). For example, the UE (e.g., using communication manager 1108 and/or CA component 1110 depicted in FIG. 11) may establish inter-band CA with an SSB anchor carrier and an SSB-less carrier, as described above.

As further shown in FIG. 9, in some aspects, process 900 may include measuring an SS-SINR of the SSB-less carrier based on a linear average of a power contribution of resource elements carrying SSSs on the anchor carrier divided by a linear average of a noise-plus-interference power contribution over the resource elements (block 920). For example, the UE (e.g., using communication manager 1108 and/or measurement component 1112 depicted in FIG. 11) may measure an SS-SINR of the SSB-less carrier based on a linear average of a power contribution of resource elements carrying SSSs on the anchor carrier divided by a linear average of a noise-plus-interference power contribution over the resource elements, as described above.

Process 900 may include additional aspects, such as any single aspect or any combination of aspects described below and/or in connection with one or more other processes described elsewhere herein.

In a first aspect, time resources for measuring the SS-SINR are based on an SMTC window duration.

In a second aspect, alone or in combination with the first aspect, an SMTC for measuring the SS-SINR of the SSB-less carrier is based on an SMTC configured for measurement of the anchor carrier.

In a third aspect, alone or in combination with one or more of the first and second aspects, measuring the SSSs on the anchor carrier includes measuring SSBs on a same frequency on the anchor carrier.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
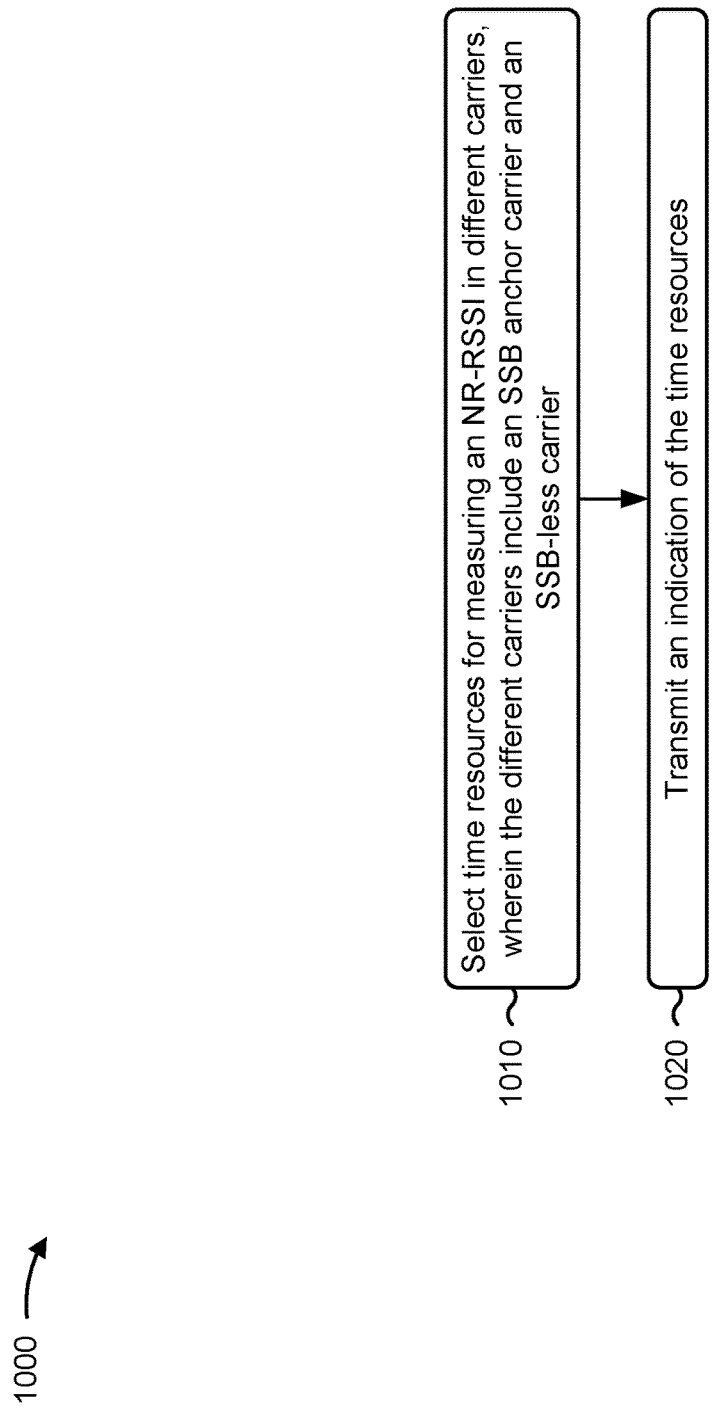
FIG. 10 is a diagram illustrating an example process performed, for example, by a network entity, in accordance with the present disclosure.

FIG. 10 is a diagram illustrating an example process 1000 performed, for example, by a network entity, in accordance with the present disclosure. Example process 1000 is an example where the network entity (e.g., a base station 110, network entity 710) performs operations associated with indicating time resources for SSB-less measurements.

As shown in FIG. 10, in some aspects, process 1000 may include selecting time resources for measuring an NR RSSI in different carriers, where the different carriers include an SSB anchor carrier and an SSB-less carrier (block 1010). For example, the network entity (e.g., using communication manager 1208 and/or selection component 1210 depicted in FIG. 12) may select time resources for measuring an NR RSSI in different carriers, where the different carriers include an SSB anchor carrier and an SSB-less carrier, as described above.

As further shown in FIG. 10, in some aspects, process 1000 may include transmitting an indication of the time resources (block 1020). For example, the network entity (e.g., using communication manager 1208 and/or transmission component 1204 depicted in FIG. 12) may transmit an indication of the time resources, as described above.

Process 1000 may include additional aspects, such as any single aspect or any combination of aspects described below and/or in connection with one or more other processes described elsewhere herein.

In a first aspect, process 1000 includes transmitting an indication of an SMTC for measuring the SS-RSSI of the SSB-less carrier.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
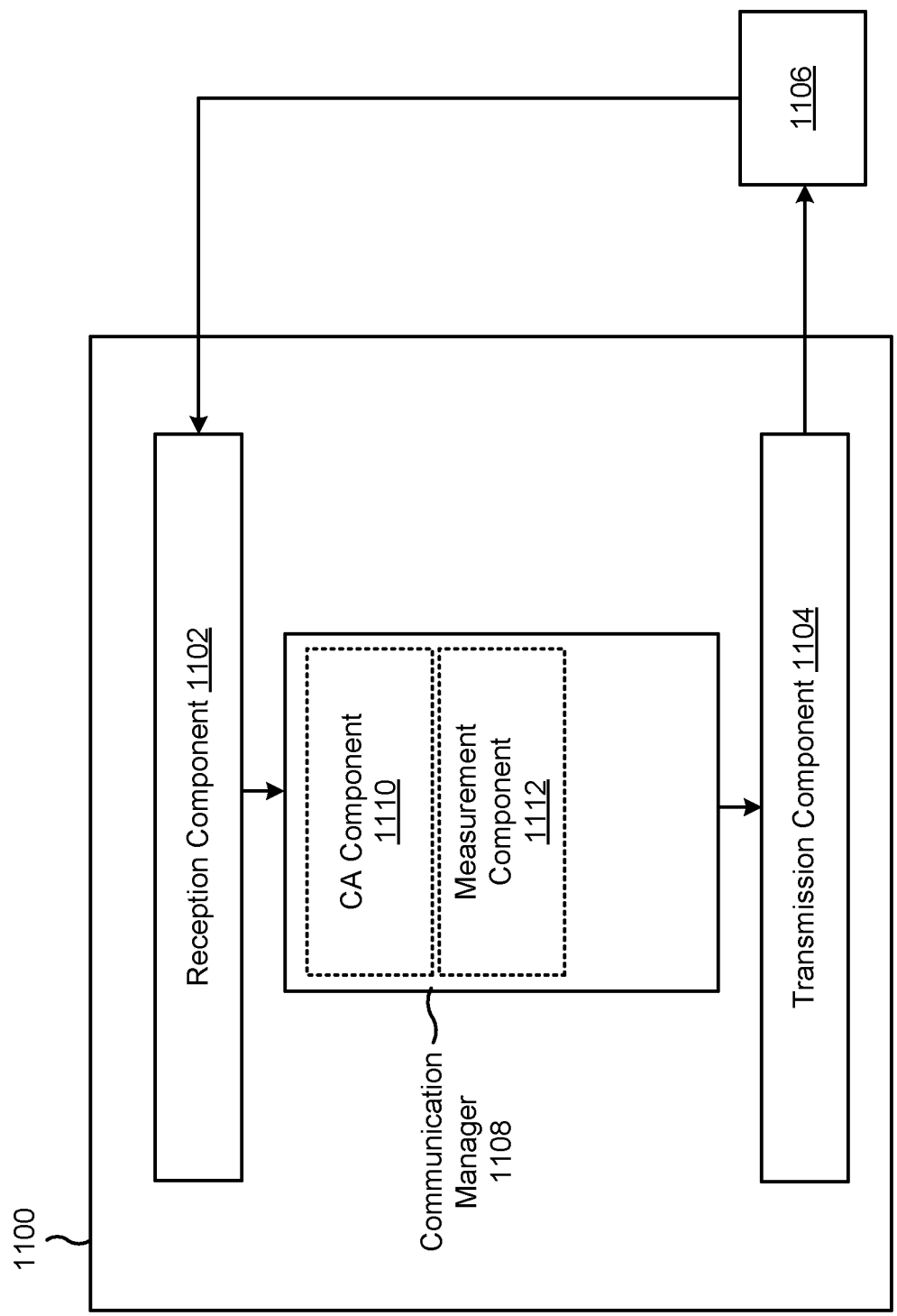
FIGS. 11-12 are diagrams of example apparatuses for wireless communication, in accordance with the present disclosure.

FIG. 11 is a diagram of an example apparatus 1100 for wireless communication. The apparatus 1100 may be a UE (e.g., a UE 120, UE 720), or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108. The communication manager 1108 may control and/or otherwise manage one or more operations of the reception component 1102 and/or the transmission component 1104. In some aspects, the communication manager 1108 may include one or more antennas, a modem, a controller/processor, a memory, or a combination thereof, of the UE described in connection with FIG. 2. The communication manager 1108 may be, or be similar to, the communication manager 140 depicted in FIGS. 1 and 2. For example, in some aspects, the communication manager 1108 may be configured to perform one or more of the functions described as being performed by the communication manager 140. In some aspects, the communication manager 1108 may include the reception component 1102 and/or the transmission component 1104. The communication manager 1108 may include a CA component 1110 and/or a measurement component 1112, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

In some aspects for measuring the SS-RSRQ, the CA component 1110 may establish inter-band CA with an SSB anchor carrier and an SSB-less carrier. The measurement component 1112 may measure an RSRQ of the SSB-less carrier based on a ratio of a quantity of resource blocks multiplied by an SS-RSRP and divided by an NR RSSI, where the SS-RSRP is measured based on an SSB on the anchor carrier.

The measurement component 1112 may measure the SS-RSSI of the SSB-less carrier using a time resource indicated for the anchor carrier. The transmission component 1104 may transmit a communication based at least in part on a measurement of the SS-RSRQ.

In some aspects for measuring the SS-SINR, the CA component 1110 may establish inter-band CA with an SSB anchor carrier and an SSB-less carrier. The measurement component 1112 may measure an SS-SINR of the SSB-less carrier based on a linear average of a power contribution of resource elements carrying SSSs on the anchor carrier divided by a linear average of a noise-plus-interference power contribution over the resource elements.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
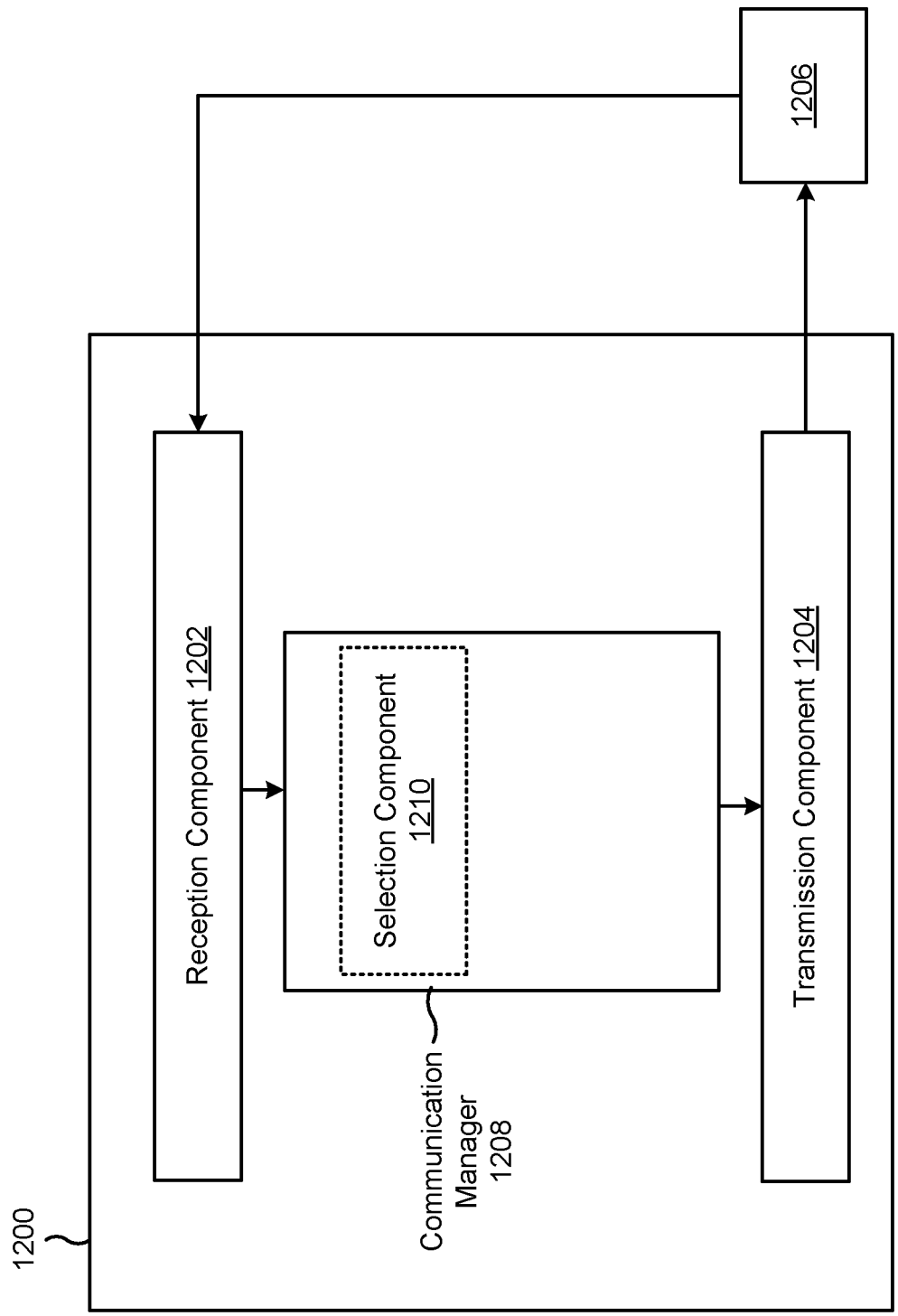

FIG. 12 is a diagram of an example apparatus 1200 for wireless communication. The apparatus 1200 may be a network entity (e.g., a base station 110, network entity 710), or a network entity may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208. The communication manager 1208 may control and/or otherwise manage one or more operations of the reception component 1202 and/or the transmission component 1204. In some aspects, the communication manager 1208 may include one or more antennas, a modem, a controller/processor, a memory, or a combination thereof, of the network entity described in connection with FIG. 2. The communication manager 1208 may be, or be similar to, the communication manager 150 depicted in FIGS. 1 and 2. For example, in some aspects, the communication manager 1208 may be configured to perform one or more of the functions described as being performed by the communication manager 150. In some aspects, the communication manager 1208 may include the reception component 1202 and/or the transmission component 1204. The communication manager 1208 may include a selection component 1210, among other examples.

In some aspects, the apparatus 1200 may be configured to perform one or more operations described herein in connection with FIGS. 1-7. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network entity described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network entity described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network entity described in connection with FIG. 2. In some aspects, the transmission component 1204 may be co-located with the reception component 1202 in a transceiver.

The selection component 1210 may select time resources for measuring an NR RSSI in different carriers, where the different carriers include an SSB anchor carrier and an SSB-less carrier. The transmission component 1204 may transmit an indication of the time resources. The transmission component 1204 may transmit an indication of an SMTC for measuring the SS-RSSI of the SSB-less carrier.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: establishing inter-band carrier aggregation with a synchronization signal block (SSB) anchor carrier and an SSB-less carrier; and measuring a synchronization signal (SS) reference signal received quality (RSRQ) of the SSB-less carrier based on a ratio of a quantity of resource blocks multiplied by an SS reference signal received power (RSRP) and divided by a New Radio (NR) received signal strength indicator (RSSI), wherein the SS-RSRP is measured based on an SSB on the anchor carrier.

Aspect 2: The method of Aspect 1, wherein an SSB-based radio resource management timing configuration (SMTC) for measuring the RSSI for the SSB-less carrier is based on an SMTC configured for measurement of the anchor carrier.

Aspect 3: The method of Aspect 1 or 2, further comprising measuring the SS-RSSI of the SSB-less carrier using a time resource indicated for the anchor carrier.

Aspect 4: The method of any of Aspects 1-3, further comprising transmitting a communication based at least in part on a measurement of the SS-RSRQ.

Aspect 5: A method of wireless communication performed by a user equipment (UE), comprising: establishing inter-band carrier aggregation with a synchronization signal block (SSB) anchor carrier and an SSB-less carrier; and measuring a synchronization signal (SS) signal-to-interference-plus-noise (SINR) of the SSB-less carrier based on a linear average of a power contribution of resource elements carrying secondary SSs (SSSs) on the anchor carrier divided by a linear average of a noise-plus-interference power contribution over the resource elements.

Aspect 6: The method of Aspect 5, wherein time resources for measuring the SS-SINR are based on an SSB-based radio resource management timing configuration (SMTC) window duration.

Aspect 7: The method of Aspect 5 or 6, wherein an SSB-based radio resource management timing configuration (SMTC) for measuring the SS-SINR of the SSB-less carrier is based on an SMTC configured for measurement of the anchor carrier.

Aspect 8: The method of any of Aspects 5-7, wherein measuring the SSSs on the anchor carrier includes measuring SSBs on a same frequency on the anchor carrier.

Aspect 9: A method of wireless communication performed by a network entity, comprising: selecting time resources for measuring a New Radio (NR) received signal strength indicator (RSSI) in different carriers, wherein the different carriers include a synchronization signal block (SSB) anchor carrier and an SSB-less carrier; and transmitting an indication of the time resources.

Aspect 10: The method of Aspect 9, further comprising transmitting an indication of an SSB-based radio resource management timing configuration (SMTC) for measuring the SS-RSSI of the SSB-less carrier.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:

establish inter-band carrier aggregation with a synchronization signal block (SSB) anchor carrier and an SSB-less carrier; and measure a synchronization signal (SS) reference signal received quality (RSRQ) of the SSB-less carrier based on a ratio of a quantity of resource blocks multiplied by an SS reference signal received power (RSRP) and divided by a New Radio (NR) received signal strength indicator (RSSI), wherein the SS-RSRP is measured based on an SSB on the anchor carrier.

2. The UE of claim 1, wherein an SSB-based radio resource management timing configuration (SMTC) for measuring the RSSI for the SSB-less carrier is based on an SMTC configured for measurement of the anchor carrier.

3. The UE of claim 1, wherein the one or more processors are configured to measure the SS-RSSI of the SSB-less carrier using a time resource indicated for the anchor carrier.

4. The UE of claim 1, wherein the one or more processors are configured to transmit a communication based at least in part on a measurement of the SS-RSRQ.

5. A user equipment (UE) for wireless communication, comprising:
a memory; and
one or more processors, coupled to the memory, configured to:
establish inter-band carrier aggregation with a synchronization signal block (SSB) anchor carrier and an SSB-less carrier; and
measure a synchronization signal (SS) signal-to-interference-plus-noise (SINR) of the SSB-less carrier based on a linear average of a power contribution of resource elements carrying secondary SSs (SSSS) on the anchor carrier divided by a linear average of a noise-plus-interference power contribution over the resource elements.

6. The UE of claim 5, wherein time resources for measuring the SS-SINR are based on an SSB-based radio resource management timing configuration (SMTC) window duration.

7. The UE of claim 5, wherein an SSB-based radio resource management timing configuration (SMTC) for measuring the SS-SINR of the SSB-less carrier is based on an SMTC configured for measurement of the anchor carrier.

8. The UE of claim 5, wherein the one or more processors, to measure the SSSs on the anchor carrier, are configured to measure SSBs on a same frequency on the anchor carrier.

9. A network entity for wireless communication, comprising:
a memory; and
one or more processors, coupled to the memory, configured to:

select time resources for measuring a New Radio (NR) received signal strength indicator (RSSI) in different carriers, wherein the different carriers include a synchronization signal block (SSB) anchor carrier and an SSB-less carrier; and
transmit an indication of the time resources.

10. The network entity of claim 9, wherein the one or more processors are configured to transmit an indication of an SSB-based radio resource management timing configuration (SMTC) for measuring the SS-RSSI of the SSB-less carrier.

11. A method of wireless communication performed by a user equipment (UE), comprising:
establishing inter-band carrier aggregation with a synchronization signal block (SSB) anchor carrier and an SSB-less carrier; and
measuring a synchronization signal (SS) reference signal received quality (RSRQ) of the SSB-less carrier based on a ratio of a quantity of resource blocks multiplied by an SS reference signal received power (RSRP) and divided by a New Radio (NR) received signal strength indicator (RSSI), wherein the SS-RSRP is measured based on an SSB on the anchor carrier.

12. The method of claim 11, wherein an SSB-based radio resource management timing configuration (SMTC) for measuring the RSSI for the SSB-less carrier is based on an SMTC configured for measurement of the anchor carrier.

13. The method of claim 11, further comprising measuring the SS-RSSI of the SSB-less carrier using a time resource indicated for the anchor carrier.

14. The method of claim 11, further comprising transmitting a communication based at least in part on a measurement of the SS-RSRQ.

15. The method of claim 11, further comprising measuring an SS signal-to-interference-plus-noise (SINR) of the SSB-less carrier based on a linear average of a power contribution of resource elements carrying secondary SSs (SSSs) on the anchor carrier divided by a linear average of a noise-plus-interference power contribution over the resource elements.

16. The method of claim 15, wherein time resources for measuring the SS-SINR are based on an SSB-based radio resource management timing configuration (SMTC) window duration.

17. The method of claim 15, wherein an SSB-based radio resource management timing configuration (SMTC) for measuring the SS-SINR of the SSB-less carrier is based on an SMTC configured for measurement of the anchor carrier.

18. The method of claim 15, wherein measuring the SSSs on the anchor carrier includes measuring SSBs on a same frequency on the anchor carrier.

* * * * *